United States Patent

Van Lookeren Campagne

[11] Patent Number: 5,810,596
[45] Date of Patent: Sep. 22, 1998

[54] MOTION SIMULATOR FOR RAIL AND ROAD BASED VEHICLES

[75] Inventor: Pieter Theodoor Jacob Van Lookeren Campagne, Amsterdam, Netherlands

[73] Assignee: Fokker Space B.V., Leiden, Netherlands

[21] Appl. No.: 801,555

[22] Filed: Feb. 18, 1997

[51] Int. Cl.$^6$ .................................................. G09B 9/04
[52] U.S. Cl. ........................... 434/62; 434/46; 434/55; 434/58
[58] Field of Search .................. 434/62, 67, 61, 434/55, 58, 37, 33, 41, 46

[56] References Cited

U.S. PATENT DOCUMENTS

| | | | |
|---|---|---|---|
| 2,485,266 | 10/1949 | Edinburg | 434/55 |
| 2,787,842 | 4/1957 | Smith et al. | 434/46 |
| 4,978,299 | 12/1990 | Deane | 434/58 |
| 5,018,973 | 5/1991 | Alef et al. | 434/62 |
| 5,082,198 | 1/1992 | Patel | 434/37 |
| 5,344,316 | 9/1994 | Hordijk et al. | 434/37 |
| 5,372,505 | 12/1994 | Smith | 434/67 |
| 5,527,184 | 6/1996 | Trumbull | 434/62 |
| 5,545,040 | 8/1996 | Lu | 434/58 |

FOREIGN PATENT DOCUMENTS

| | | |
|---|---|---|
| 0 172 291 | 2/1986 | European Pat. Off. . |
| 242503 | 1/1987 | Germany ..................... 434/62 |
| 3274587 | 12/1991 | Japan .......................... 434/62 |
| 1 350 941 | 4/1974 | United Kingdom . |
| 1 545 121 | 5/1979 | United Kingdom . |
| 2 068 322 | 8/1981 | United Kingdom . |

*Primary Examiner*—Paul J. Hirsch
*Attorney, Agent, or Firm*—Young & Thompson

[57] ABSTRACT

Apparatus for simulating the motion of a vehicle includes a base frame, a subframe which is movable in relation to the base frame, the movements of the subframe simulating the real life movements of the vehicle, and first, second, third and fourth linkage members each connected through a universal joint both to the base frame as well as to the subframe. The first and second linkage members are positioned in a first imaginary plane and the third and fourth linkage members are positioned in a second imaginary plane, the first and second imaginary plane intersecting each other at a first intersection line. The first and third linkage members are positioned in a third imaginary plane and the second and fourth linkage members are positioned in a fourth imaginary plane, the second and fourth imaginary plane intersecting each other at a second intersection line. The first and second intersection lines cross each other at right angles.

6 Claims, 5 Drawing Sheets

MOTION SIMULATOR FOR RAIL AND ROAD BASED VEHICLES

The invention relates to an apparatus for simulating the motion of a vehicle, especially the motion of a rail or road based vehicle, which apparatus accurately conveys the feeling sensed by a passenger of the real vehicle using a motion imparting mechanism with only a restricted number of degrees of freedom.

Prior art motion simulators having 6 degrees of motion freedom are already known and for instance described in U.S. Pat. No. 3,295,244 and GB-2,068,322. These simulators with six degrees of motion freedom are, however, very expensive and very bulky in size. A system of 3 m in height for aircraft motion simulator can be considered as an average. A typical characteristic of a six degree of freedom system is that the excursions in surge, sway and heave, i.e. excursions in the directions of the three orthogonal axes, are of similar magnitude.

For road and rail based vehicles the main motions experienced by the operator and passengers of the vehicle are essentially acceleration and deceleration in longitudinal direction, some transversal movements, and some short movements in vertical direction (bumps). Therefore motion simulators for rail or road based vehicles have to comply with specific pitch/surge requirements for the simulation of sustained acceleration and deceleration in longitudinal direction; specific roll/sway requirements for simulation of the transversal movements; and specific heave requirements for simulation of movements in vertical direction.

Depending on the amount of sustained acceleration/deceleration in longitudinal direction to be simulated, the surge/pitch excursion of the simulator is required to be larger or smaller. In case of rail or road base vehicles the surge/pitch excursion generally is the largest of all various excursions.

The transversal movements to be simulated require a roll/sway excursion of the simulator, which generally is smaller in dimension than the pitch/surge excursion.

The vertical movements can be either simulated or left out, generally the required heave excursion of the simulator will be smaller than the pitch/surge excursion.

The perceived motions of braking, full stop, fast accelerations, constant accelerations or impact etc. in a rail or road based vehicle are motions in the longitudinal plane. It has been ascertained that these movements can be mechanically translated into a forward surge excursion of the simulator platform combined with pitch rotation about an imaginary pitch axis located at a predetermined height above the cabin vehicle base.

The perceived transversal rocking motion of a rail or road based vehicle according to the invention can be analyzed a combination of sway and roll at the same time. In a mechanical sense this motion can be translated into a single rotation about a point located below the vehicle operator. Simulation will take place by roll/sway excursion about the roll axis. Hereby the following motions can be accurately simulated:

rocking sway motion e.g. due to track or rail irregularities;
shock waves, e.g. due to passing other vehicles and/or tunnels;
entering or exiting a curve;
large numbers of passengers getting on or off the vehicle.

The perceived vertical motions of the vehicle are simulated by a mechanism that allows heave excursions of the simulator cabin in a vertical direction. The motion cues simulated are movements caused by track or road irregularities, braking vibrations, engine vibrations, suspension pounding etc.

In order to simulate any movement the actual accelerations are measured in a realistic situation or calculated in an accurate model of the vehicle, and processed. From the calculations projected axes of rotation for pitch, roll and yaw type motions are derived.

For aircraft the projected axes of rotation for pitch, roll, and yaw intersect into a central point. This central point is located inside the aircraft. Movement about these intersecting axes is relatively simple, since it entails movement about the central point. Therefore, all early day aircraft motion simulators are based on pitch, yaw, and roll axes intersecting in a central projected point of rotation positioned within or at the base of the simulator. This resulted in simulation systems with three degrees of freedom. Linear degrees of motion were added and the conventional state-of-the-art motion simulator with six degrees of freedom emerged.

For road and rail based vehicles processing the accelerations of movement as measured in realistic situations results in simulator excursions about projected axes for pitch and roll which do not intersect in a central point. This establishes the need for a simulator functioning with non-intersecting pitch and roll axes. Usually the amount of pitch/surge excursion necessary to simulate sustained acceleration and deceleration in longitudinal direction is carried out around a pitch axis located above the vehicle. Similarly a roll axis below the driver will fulfil the requirements for simulating movement in transversal direction. Subsequently these pitch and roll axes must be located at predetermined heights relative to the simulator cabin in order to be able to properly simulate the movements of a rail or road based vehicle. It is because of these predetermined positions of the non-intersecting pitch and roll axes relative to the simulator cabin that a state-of-the-art simulator is not able to adequately simulate and convey a realistic feeling of the movements of rail and road based vehicles.

The invention now provides an apparatus for simulating the motion of a vehicle, said apparatus comprising
 a base frame
 a subframe which is movable in relation to said base frame, the movements of said subframe simulating the real life movements of said vehicle,
 a first, second, third and fourth linkage member each connected through a universal joint both to the base frame as well as to the subframe,
whereby,
 the first and second linkage members are positioned in a first imaginary plane and the third and fourth linkage members are positioned in a second imaginary plane, the first and second imaginary plane intersecting each other at a first intersection line, said first intersection line being positioned in or underneath the base frame,
 the first and third linkage members are positioned in a third imaginary plane and the second and fourth linkage members are positioned in a fourth imaginary plane, the second and fourth imaginary plane intersecting each other at a second intersection line,
 the first and second intersection lines are crossing each other at right angles,
the apparatus furthermore comprising
actuators connected between the base frame and either the linkage elements or the subframe.

Depending on the kind of movements to be simulated, the predetermined height of the pitch and roll axes of the simulator according to the invention can be chosen independently. This has a big advantage because in order to simulate sustained movements either in longitudinal or transversal directions it is necessary to combine surge and pitch excursions or roll and sway excursions. For pitch and roll type excursions the simulator platform has to be tilted, in order for the gravity vector of this tilt to convey a sustained acceleration feeling to the person in the motion simulator cabin. It is essential that the tilting motion of the simulator platform is executed slowly. A slow tilting movement will not be perceived as a rotational movement by the person in the simulator cabin, whereas above a certain rotation-speed the person will perceive the movement as a rotational movement instead of a g-force due acceleration or deceleration. There are empirical data from tests in flight simulators which give threshold perceptions for roll, pitch and yaw expressed in degrees or radials per $sec^2$. (Report LR-265, Delft University of Technology, Department of Aerospace Engineering, "Vestibular models and thresholds of motion perception. Results of tests in a flight simulator." By R. J. A. W. Hosman & J. C. van der Vaart, April 1978). Forward surge combined with slow rotation about pitch pole (below the threshold of perception) will be perceived by the person in the simulator cabin as a longitudinal acceleration because the g-vector of the resulting longitudinal tilt conveys a sustained acceleration cue. The same is the case for decelerations. In contrast, for so called onset cues, generated by e.g. vibrations or shunting, hardly any forward surge is necessary but a fast pitch rotation is required. The motion platform according to the invention can be supported in such a way that the pitch axis is positioned at a predetermined height relative to the vehicle base and that large forward and backward surge excursions of the platform are possible. Other embodiments with less required pitch/surge excursions may have the pitch axis at a lower predetermined height.

Similarly for transversal movements the axis for roll/sway excursions may be chosen at a predetermined height.

The invention will be explained in more detail with reference to the attached drawings.

Figure 1:
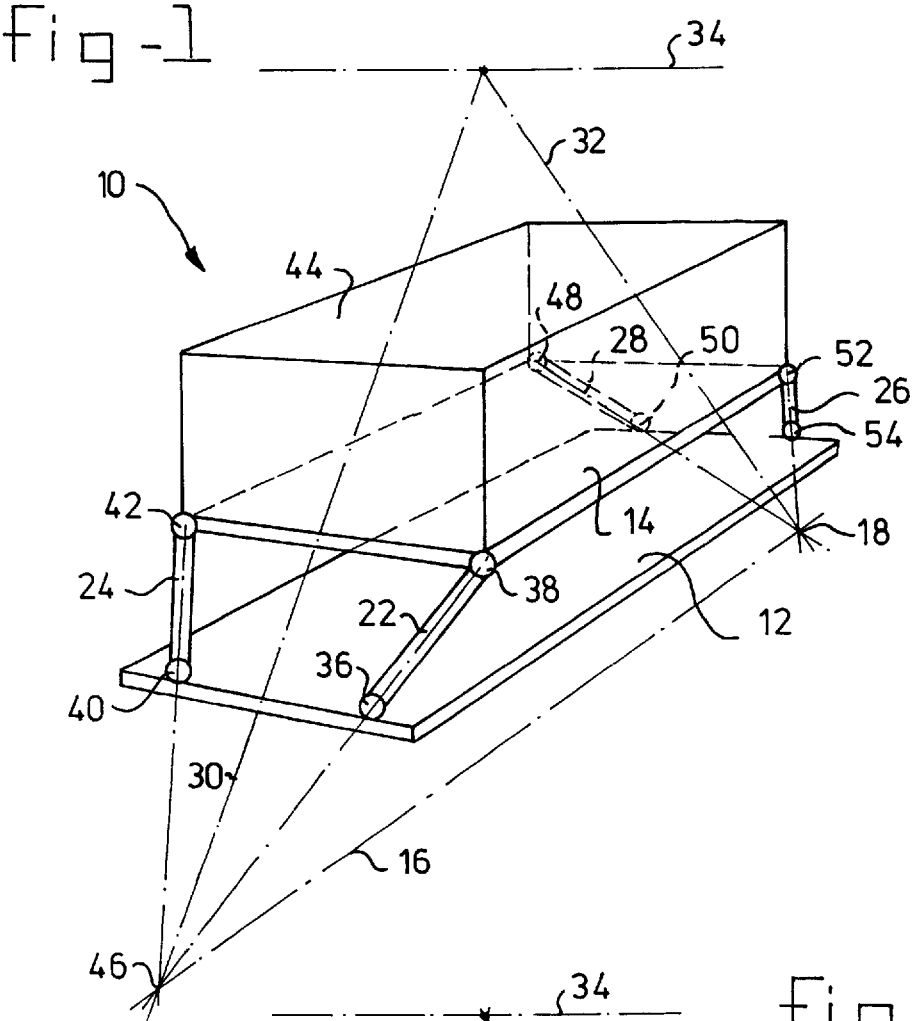
FIG. 1 shows schematically a motion simulator according to the invention.

FIG. 1 illustrates schematically a motion simulator according to the invention. The simulator, in general indicated by 10, comprises a base frame 12, represented by a flat plate, a subframe 14 also represented by a flat plate and four linkage members 22, 24, 26, 28. The first linkage member 22 is by means of a universal joint 36 connected to the base frame 12 and through a further universal joint 38 connected to the subframe 14. The second linkage member 34 is through a universal joint 40 connected to the base frame 12 and through a further universal joint 42 connected to the subframe 14.

In a corresponding manner the third linkage member 26 and the fourth linkage member 28 are through universal joints 52, 54 and 50, 48, respectively, connected both to the base frame 12 and to the subframe 14. It is assumed that the subframe 14 in the illustrated embodiment forms the bottom of a cabin 44.

As indicated in FIG. 1 the central lines through the first linkage member 22 and through the second linkage member 24 are intersecting at point 46. That implies that the first and second linkage members 22 and 24 are positioned in a first plane. The imaginary line 30 through the intersection point 46 is also drawn in said plane.

The third linkage member 26 and fourth linkage member 28 are in a similar manner positioned in a second plane together with the imaginary line 32. Lines through the linkage members 26 and 28 and the line 32 intersect at point 18. Said intersection line 34 extends in transversal direction.

As illustrated in FIG. 1 the first plane determined by line 30 and the linkage members 22 and 24 intersects the second plane determined by the third linkage member 26, the fourth linkage member 28 and the imaginary line 32 in the intersection line 34.

In a similar manner the first linkage member 22 and the third linkage member 26 together define a third plane, the second linkage member 24 and the fourth linkage member 28 together define a fourth plane and both the third and fourth planes intersect in the line of intersection 16 extending through the already mentioned points 46 and 18.

The system comprises furthermore a number of actuators connected to the various components such that the whole system is in a stable condition if the actuators are not changing their attitude, whereas a controlled activation of these actuators will result in pitch/surge excursions in longitudinal direction or a roll/sway excursion in transversal direction or both.

The direction of the surge movement of the cabin 44 is defined by the intersection line 16. This surge movement will be accompanied by a small pitch movement of the cabin as if the cabin rotates around the imaginary intersection line 34. This pitch movement is caused by the fact that the distance between the joints 38 and 52 is smaller than the distance between the joints 36 and 54 and, in a similar manner, the distance between the joints 42 and 48 is smaller than the distance between the joints 40 and 50.

With proper control of the actuators also a movement in the transversal direction, the direction defined by the intersecting line 34 can be carried out. This roll/sway excursion is caused by the fact that the distance between the joints 40 and 36 is smaller than the distance between the joints 42 and 38 and, in a similar manner, the distance between the joints 50 and 54 is smaller than the distance between the joints 48 and 52.

Figure 2:
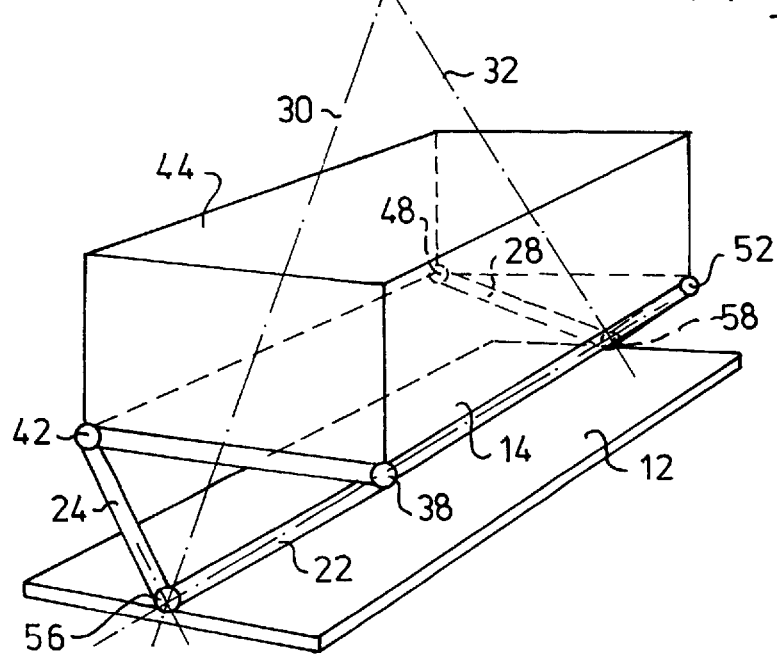
FIG. 2 shows schematically a specific embodiment of the simulator according to the invention.

An embodiment wherein the universal joints 36 and 40 are integrated into one universal joint 56 and in which in a similar manner the universal joints 50 and 54 connecting the linkage members 26 and 28 to the base frame 12 are combined into one universal joint 58 is illustrated in FIG. 2. Because of this combination of joints the intersection line 16 is in fact moved upwards and runs now through the base frame 12. The result thereof will be a maximization of the roll/sway excursion.

Figure 3:
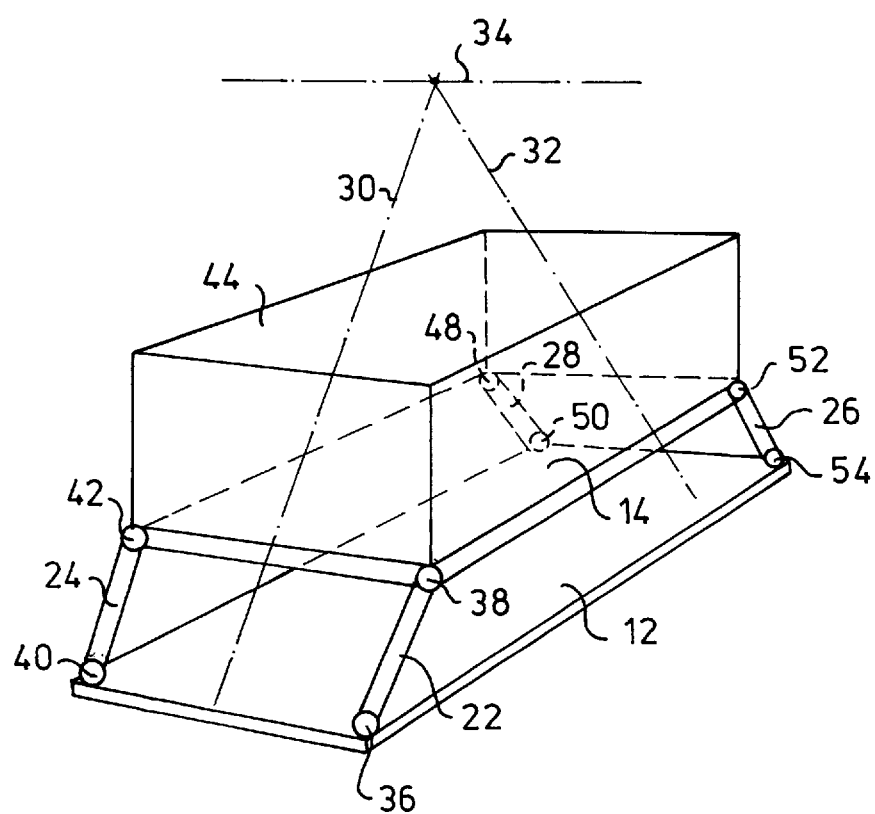
FIG. 3 shows another specific embodiment of the motion simulator according to the invention.

If it is desired to eliminate the roll/sway excursion completely, then the simulator has to be embodied as illustrated in FIG. 3. In this embodiment the distance between the joints 42 and 38 is equal to the distance between the joints 40 and 36 and in a similar manner the distance between the joints 48 and 52 is equal to the distance between the joints 50 and 54. This implies that the line of intersection 16 is in fact shifted to infinity which results into a complete elimination of the roll movement.

Figure 4:
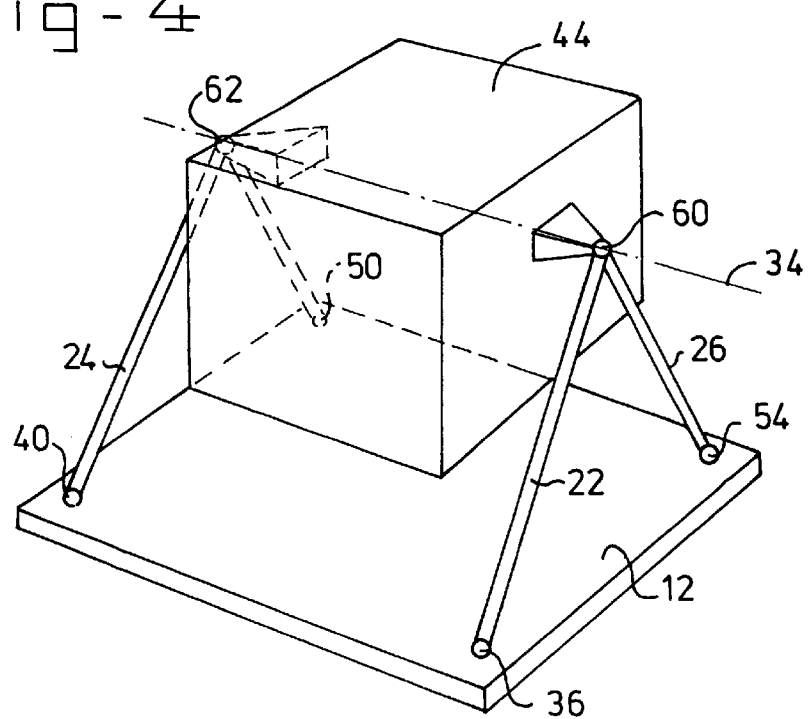
FIG. 4 shows yet another embodiment of the simulator according to the invention.

A further specific embodiment is illustrated in FIG. 4. In this embodiment the universal joints connecting the linkage members 22 and 26 to the subframe are combined into one joint 60 and in a similar manner the universal joints connecting the linkage members 24 and 28 to the subframe are combined into one joint 62. Furthermore, the intersection line 34 now extends through the combined joints 62 and 60 with the result that pitch/surge excursions will be carried out around these joints.

The embodiment illustrated in FIG. 3 is able to carry out sway movements (in transversal direction). If the distance between the joints 60 and 62 corresponds to the distance between the joints 40 and 36 respectively between the joints 54 and 50, which situation is assumed in FIG. 3.

Figure 5:
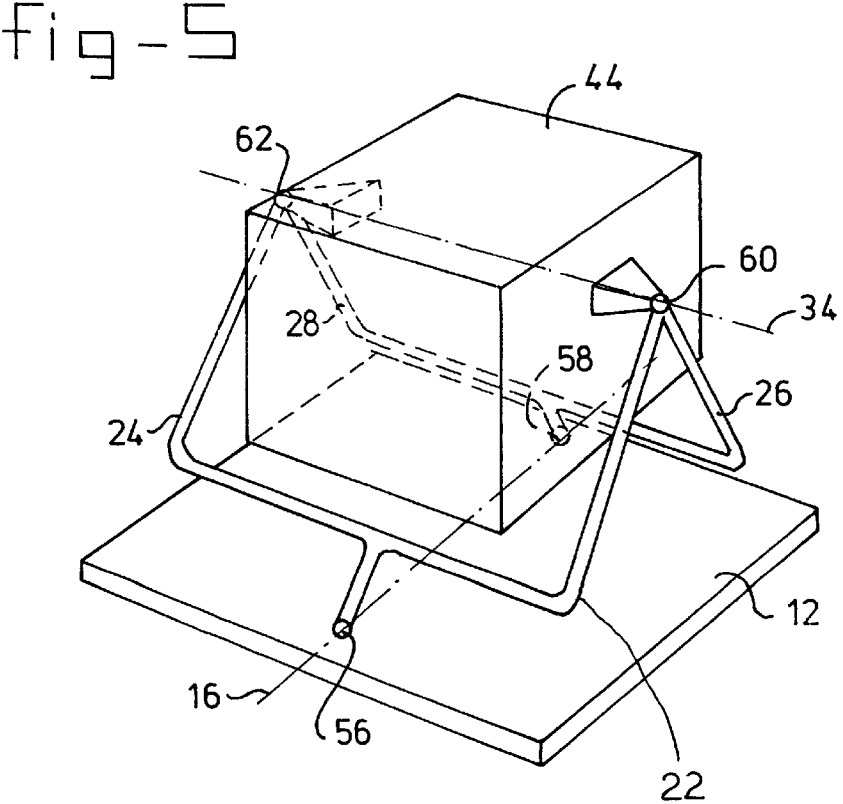
FIG. 5 shows a further embodiment of the simulator according to the invention.

A very specific embodiment is illustrated in FIG. 5. In this embodiment the joints for connecting the linkage members 22 and 24 to the base plate are combined into one joint 56, the joints connecting the linkage members 26 and 28 to the base plate are combined into one single joint 58, the joints connecting the linkage members 22 and 26 to the subframe are connected into one single joint 60 and finally also the joints connecting the linkage members 24 and 28 to the subframe are combined into one single joint 62. It will be clear that in this embodiment the cabin 44 may carry out a roll/sway excursion around the line 16 and a pitch/sway excursion around the line 34.

Figure 6:
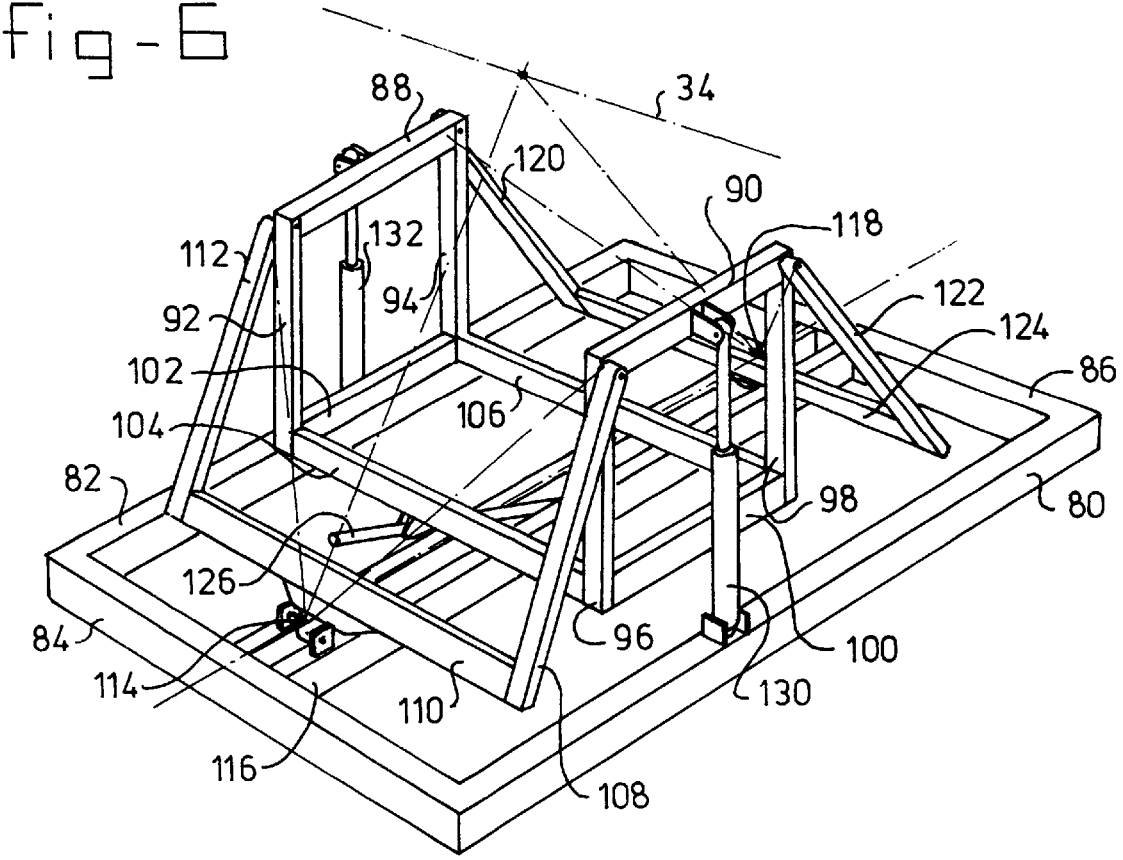
FIG. 6 illustrates a more practical embodiment operating on the principles illustrated in FIG. 2.

A more practical embodiment, based on the principles illustrated in FIG. 2, is illustrated in FIG. 6. In this embodiment the base frame comprises the beams 80, 82, 84, and 86 which are positioned in the base plane. The subframe comprises in this embodiment the parallel beams 88 and 90 connected to the cabin, of which only the cabin frame members 92, 94, 96, 98, 100, 102, 104, and 106 are illustrated in FIG. 6. The first and second linkage members are not embodied as elongated straight beams, but are formed as a combination of the beams 108, 110, and 112. The beam 108 is pivotally connected to one end of the subframe beam 90, the beam 112 is pivotally connected to one end of the other subframe beam 88, and the lower beam 110 is through a universal joint 114 connected to the base frame, more specifically to the additional beam 116 extending parallel to the beams 80 and 82 at equal distances thereof between the transversal beams 84 and 86. In a similar manner the third and fourth linkage beams are manufactured as a combination of the beams 120, 122, and 124. The beam 122 is pivotally connected to the other end of the subframe beam 90, the beam 120 is pivotally connected to the other end of the subframe beam 88, and the interconnecting beam 124 is in the centre thereof through a universal joint 118 connected to the additional parallel beam 116.

To impart a motion transverse to the direction in which the simulated vehicle moves, two actuators are installed, represented by hydraulic rams 130 and 132. The hydraulic ram 130 is pivotally connected on the one hand to the beam 80 of the base frame and on the other hand to the beam 90 of the subframe. The hydraulic ram 132 is in a similar manner connected on the one hand to beam 82 of the base frame and on the other hand to beam 88 of the subframe. It will be clear that, in case both rams are activated in counterphase the cabin will start rolling around the imaginary centre line through the universal joints 114 and 118.

Figure 7:
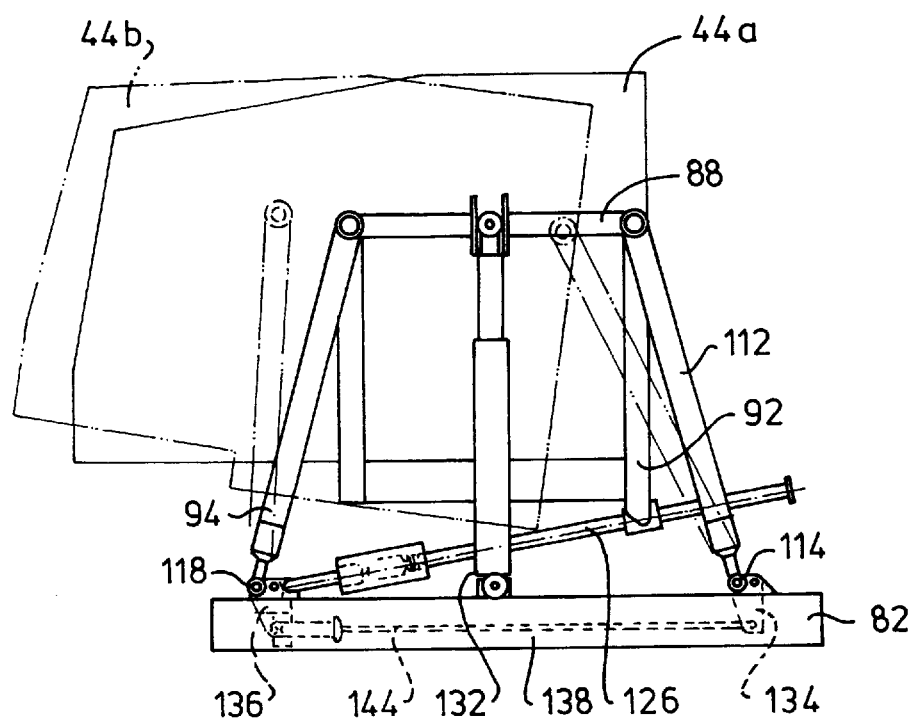
FIG. 7 illustrates the motions, which can be developed using the system illustrated in FIG. 6.

A further actuator 126 is installed underneath the cabin frame in a manner which is more specifically illustrated in FIG. 7. FIG. 7 shows a side view of the apparatus illustrated in FIG. 6. As is shown, the further actuator 126 is installed between the base frame, i.e. the universal joint 118, and a point in the middle of the beam 104. By extending the actuator 116 the cabin will move forward and rotate about pitch axis and by retracting the actuator 126 the cabin will move backwards. By means of the full line 44a an embodiment of the cabin is illustrated in the central position. By retracting the actuator 126 the cabin will move backwards to a position which is illustrated by dash-and-dot lines 44b and will simultaneously carry out pitch and surge excursions as will be clear from the figure.

In some cases it is desirable to let the simulator carry out a small movement in vertical direction thereby simulating for instance small holes in the road. Such a heave movement can be simulated for instance by means of the two rams 130 and 132 operating simultaneously on the condition that the joints 114 and 118 are able to move in vertical direction upwards or downwards. To provide this possibility the joints 114 and 118 are not attached directly to the base frame but are attached to a small intermediate linkage member 134, respectively 136. Those intermediate linkage members 134, 136 are connected to the base frame by means of the pivot connections 140, 142, respectively. Furthermore, both members 134 and 136 are interconnected by means of a linkage member 144, the function of which is to assure that both members 134 and 136 will always move simultaneously. It will be clear from FIG. 7 that by extending both rams 130, 132 simultaneously the additional linkage members will start rotating about their pivot connection such that the subframe, defined by the beams 88 and 90, will move upwards. In a similar manner by retracting both rams simultaneously the subframe will descend to a lower level.

Figure 8:
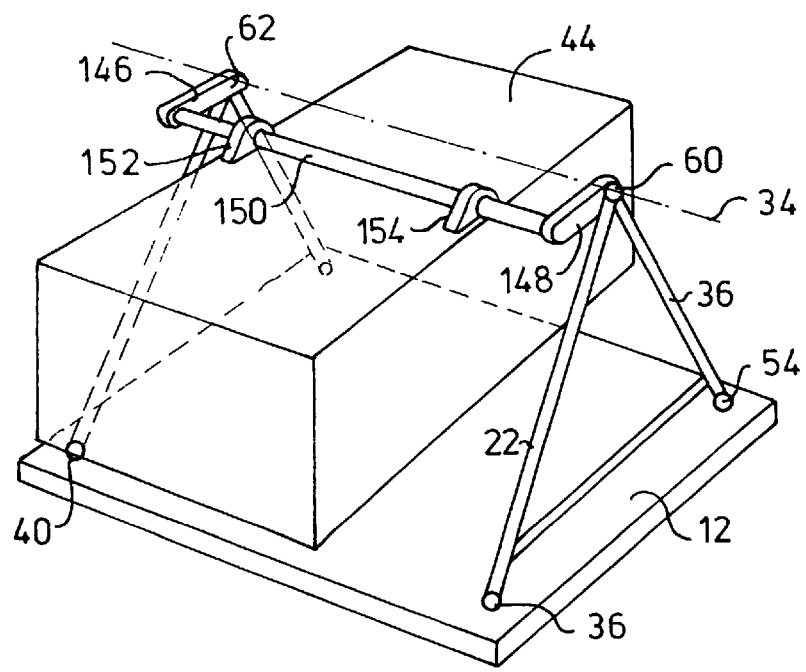
FIG. 8 illustrates a further development of the embodiment shown in FIG. 2.

Other means to carry out a heave motion can be installed in other embodiments of the simulator. A further developed embodiment of FIG. 4 is for instance illustrated in FIG. 8. The cabin 44 is not directly attached to the joints 60 and 62 as in FIG. 4, but is attached to a bar 150 extending parallel to the roll axis 34. The bar 150 is connected to the joints 62 and 60 through short linkage members 146 and 148. The cabin is in this embodiment suspended from the bar 150 by means of the high members 152 and 154 as may carry out a rotational movement around the bar 150. By installing proper actuators the additional linkage members 146 and 148 may rotate around the joints 60 and 62 thereby imparting a heave motion to the cabin 44.

I claim:

1. Apparatus for simulating the motion of a vehicle, said apparatus comprising a base frame a subframe which is movable in relation to said base frame, the movements of said subframe simulating the real life movements of said vehicle, a first, second, third and fourth linkage member each connected through universal joints to the base frame as well as to the subframe, and each said linkage member having an effective arm represented by a virtual straight line between its respective said joints, whereby, the effective arms of said first and second linkage members are positioned in a first imaginary plane and the effective arms of said third and fourth linkage members are positioned in a second imaginary plane, the first and second imaginary planes intersecting each other at a first intersection line, the effective arms of said first and third linkage members are positioned in a third imaginary plane and the effective arms of said second and fourth linkage members are positioned in a fourth imaginary plane, the third and fourth imaginary planes intersecting each other at a second intersection line, the first and second intersection lines are crossing each other at right angles, the apparatus furthermore comprising actuators connected between the base frame and either the linkage members or the subframe.

2. The apparatus according to claim 1, wherein the universal joints connecting the first and second linkage members to the base frame are integrated into one universal joint, and the universal joints connecting the third and fourth linkage members to the base frame also are integrated into one universal joint.

3. The apparatus according to claim 1, wherein the universal joints connecting the first and third linkage members to the subframe are integrated into one universal joint, and the universal joints connecting the second and fourth linkage members to the subframe also are integrated into one universal joint.

4. The apparatus according to claim 1, wherein the universal joints connecting the first and second linkage members to the base frame are integrated into one universal joint, and the universal joints connecting the third and fourth linkage members to the base frame also are integrated into one universal joint and wherein the universal joints connecting the first and third linkage members to the subframe are integrated into one universal joint, and the universal joints connecting the second and fourth linkage members to the subframe also are integrated into one universal joint.

5. Apparatus for simulating the motion of a vehicle, said apparatus comprising a base frame a subframe which is movable in relation to said base frame, the movements of said subframe simulating the real life movements of said vehicle, a first, second, third and fourth linkage member each connected through universal joints to the base frame as well as to the subframe, and each said linkage member having an effective arm represented by a virtual straight line between its respective said joints, whereby, the effective arms of said first and second linkage members are positioned in a first imaginary plane and the effective arms of said third and fourth linkage members are positioned in a second imaginary plane, the first and second imaginary planes intersecting each other at a first intersection line, said first intersection line being positioned above the base frame, wherein the distance between the universal joints connecting the first and second linkage members to the base frame is equal to the distance between the universal joints connecting the first and second linkage members to the subframe and the distance between the universal joints connecting the third and fourth linkage members to the base frame is equal to the distance between the universal joints connecting the third and fourth linkage members to the subframe, the apparatus furthermore comprising actuators connected between the base frame and either the linkage elements or the subframe.

6. Apparatus for simulating the motion of a vehicle, said apparatus comprising a base frame a subframe which is movable in relation to said base frame, the movements of said subframe simulating the real life movements of said vehicle, a first, second, third and fourth linkage member each connected through universal joints to the base frame as well as to the subframe, and each said linkage member having an effective arm represented by a virtual straight line between its respective said joints, whereby, the effective arms of said first and third linkage members are positioned in a third imaginary plane and the effective arms of said second and fourth linkage members are positioned in a fourth imaginary plane, the third and fourth imaginary planes intersecting each other at a second intersection line, said second intersection line being positioned below the base frame, wherein the distance between the universal joints connecting the first and third linkage members to the base frame is equal to the distance between the universal joints connecting the first and third linkage members to the subframe and the distance between the universal joints connecting the second and fourth linkage members to the base frame is equal to the distance between the universal joints connecting the second and fourth linkage members to the subframe, the apparatus furthermore comprising actuators connected between the base frame and either the linkage elements or the subframe.

* * * * *